(12) United States Patent
Burg et al.

(10) Patent No.: US 9,739,179 B2
(45) Date of Patent: Aug. 22, 2017

(54) WORKING FLUID FOR A DEVICE, DEVICE AND METHOD FOR CONVERTING HEAT INTO MECHANICAL ENERGY

(71) Applicant: International Business Machines Corporation, Armonk, NY (US)

(72) Inventors: Brian Burg, Rueschlikon (CH); Bruno Michel, Rueschlikon (CH); Stephan Paredes, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 14/657,567

(22) Filed: Mar. 13, 2015

(65) Prior Publication Data

US 2016/0265390 A1 Sep. 15, 2016

(51) Int. Cl.

| | |
|---|---|
| *F01K 25/08* | (2006.01) |
| *F01K 11/00* | (2006.01) |
| *F01K 9/00* | (2006.01) |
| *F01K 11/02* | (2006.01) |
| *F01K 3/06* | (2006.01) |
| *C09K 5/04* | (2006.01) |

(Continued)

(52) U.S. Cl.
CPC .............. *F01K 11/02* (2013.01); *C09K 5/048* (2013.01); *F01K 3/06* (2013.01); *F01K 7/16* (2013.01); *F01K 9/003* (2013.01); *F01K 25/04* (2013.01); *F01K 25/08* (2013.01)

(58) Field of Classification Search
USPC ................................................ 60/641.1–681
See application file for complete search history.

(56) References Cited

U.S. PATENT DOCUMENTS

| | | | | |
|---|---|---|---|---|
| 1,889,586 A | * | 11/1932 | Grebe ..................... | F01K 3/181 |
| | | | | 122/33 |
| 2,902,830 A | * | 9/1959 | Lenz ....................... | F01K 3/205 |
| | | | | 122/235.11 |

(Continued)

FOREIGN PATENT DOCUMENTS

| | | |
|---|---|---|
| CN | 102191957 A | 9/2011 |
| DE | 10 21 861 B | 1/1958 |

(Continued)

OTHER PUBLICATIONS

Ho et al., "Comparison of the Organic Flash Cycle (OFC) to other advanced vapor cycles for intermediate and high temperature waste heat reclamation and solar thermal energy," Energy 42 (2012) pp. 213-223, received Aug. 27, 2011, Available online Apr. 22, 2012.

(Continued)

*Primary Examiner* — Laert Dounis
(74) *Attorney, Agent, or Firm* — Scully, Scott, Murphy & Presser, P.C.; Daniel P. Morris, Esq.

(57) ABSTRACT

A working fluid (6) for a device (4) for converting heat into mechanical energy is disclosed. The working fluid (6) comprises a fluid (7) having a boiling temperature in the range between 30 and 250° C. at a pressure of 1 bar and nanoparticles (8) which are dispersed or suspended in the liquid phase of the fluid (7). Said nanoparticles (8) are instrumented as condensation and/or boiling nuclei and the surface of said nanoparticles (8) is adapted to support condensation and/or boiling.

15 Claims, 8 Drawing Sheets

(51) Int. Cl.
*F01K 7/16* (2006.01)
*F01K 25/04* (2006.01)

(56) References Cited

U.S. PATENT DOCUMENTS

| | | | | |
|---|---|---|---|---|
| 3,533,231 | A * | 10/1970 | Lacy | F01K 21/005 |
| | | | | 122/40 |
| 5,231,832 | A | 8/1993 | Tarman | |
| 8,091,361 | B1 | 1/2012 | Lang | |
| 8,166,761 | B2 | 5/2012 | Moghtaderi et al. | |
| 8,572,959 | B2 | 11/2013 | Ingersoll et al. | |
| 8,601,816 | B2 * | 12/2013 | Walker | H02K 44/08 |
| | | | | 310/11 |
| 2008/0264062 | A1 * | 10/2008 | Prueitt | F01K 27/00 |
| | | | | 60/670 |
| 2013/0232975 | A1 * | 9/2013 | Saffer | F04C 18/0269 |
| | | | | 60/643 |
| 2014/0075944 | A1 | 3/2014 | Tavares et al. | |
| 2016/0319703 | A1 * | 11/2016 | Burg | F01K 5/02 |

FOREIGN PATENT DOCUMENTS

| | | | |
|---|---|---|---|
| DE | 10 2005 046 720 A1 | 4/2007 | |
| DE | 102005046720 A1 * | 4/2007 | F01D 25/32 |
| DE | 10 2009 056 839 A1 | 6/2011 | |
| DE | 102009056839 * | 6/2011 | F01D 25/007 |
| WO | WO 2013/119998 | 8/2013 | |

OTHER PUBLICATIONS

Saadatfar et al., "Thermodynamic Vapor Cycles for Converting Low-to Medium-grade Heat to Power: A State-of-the-art Review and Future Research Pathways," JMES vol. 2, Issue 1 (2014), Published Jan. 10, 2015, pp. 1-25.

Vosough et al., "Improvement Power Plant Efficiency with Condenser Pressure," International Journal of Multidisciplinary Sciences and Engineering, vol. 2, No. 3, Jun. 2011, pp. 38-43.

International Search Report and Written Opinion of the International Searching Authority dated May 13, 2016 received in related application PCT/EP2016/055053.

* cited by examiner

WORKING FLUID FOR A DEVICE, DEVICE AND METHOD FOR CONVERTING HEAT INTO MECHANICAL ENERGY

This disclosure relates to a working fluid for a device for converting heat into mechanical energy, a device for converting heat into mechanical energy and a method for converting heat into mechanical energy.

Most of today's electrical energy is generated by utilizing a thermodynamic cycle for creating mechanical work. The Carnot cycle is an ideal theoretical thermodynamic cycle proposed by Nicolas Léonard Sadi Carnot. This theoretical cycle sets an upper limit for the efficiency of any thermodynamic cycle for converting a given amount of heat into work between two thermal reservoirs. The cycle for two-phase working fluids is the Rankine cycle. William J. M. Rankine provided the fundamental thermodynamic underpinning of the steam engine that is considered the practical Carnot cycle for a two-phase working fluid because the T-s diagram resembles the Carnot cycle. The main difference is that heat addition (in the boiler) and rejection (in the condenser) are isobaric in the Rankine cycle and isothermal in the theoretical Carnot cycle. A pump pressurizes the working fluid received from the condenser. All of the energy in pumping the working fluid through the cycle is lost, as is all of the energy of vaporization in the boiler which is rejected in the condenser. Pumping the liquid working fluid requires about 1-3% of the turbine power. The efficiency of a Rankine cycle is limited by the working fluid and equipment materials. Steam entry temperatures into the turbine are ~565° C. and condenser temperatures are ~30° C. This gives a theoretical Carnot efficiency of ~63% and an actual efficiency of 42% for a modern multistage power station, the 21% are mainly lost in the boiler and condenser for expansion work against a pressure and due to thermal gradients in boiling and condensation. While many working fluids could be used, water is the fluid of choice since it is nontoxic, unreactive, abundant, low cost, and has good thermodynamic properties. When a Rankine cycle is implemented with organic working fluids, it is commonly referred to as on Organic Rankine cycle (ORC).

The classical Rankine engines have four discrete components: the boiler, the expansion device, the condenser and the pump. Additionally, the classical Rankine engines involve a phase change between gas phase and liquid phase. The most prominent features of the Rankine cycle are a separation of the boiler and the condenser from the expansion device and to avoid phase changes of the working fluid from liquid to gas in the expansion device. The efficiency of classical Rankine engines is limited since they cannot make use of the volume increase due to the phase change process and due to the adiabatic expansion process without reheat and due to temperature gradients between heat source, working fluid, and heat sink. The main reasoning for the separation of the heating and cooling heat exchanger from the expansion device is the volume incompatibility. This means that the volume of a heat exchanger is much larger than of an expansion device. Small temperature gradients are much more important for low grade heat sources since they trigger a much larger relative efficiency loss than in high grade conversion processes.

Document U.S. Pat. No. 8,166,761 B2 discloses alternative cycles to the Rankine cycle that have more energy efficiency.

It is therefore an aspect of the present disclosure to provide an improved working fluid for a device for converting heat into mechanical energy that allows boiling and condensation in a smaller volume and expansion in a larger volume and that allows a higher overall efficiency.

It is another aspect of the present disclosure to provide an improved device for converting heat into mechanical energy.

It is yet another aspect of the present disclosure to provide an improved method for converting heat into mechanical energy.

Accordingly, a working fluid for a device for converting heat into mechanical energy is disclosed. The working fluid comprises a fluid having a boiling temperature in the range between 30 and 250° C. at a pressure of 1 bar and nanoparticles which are dispersed or suspended in the liquid phase of the fluid. Said nanoparticles are instrumented as condensation and/or boiling nuclei and the surface of said nanoparticles is adapted to support condensation and/or boiling.

According to an embodiment of the working fluid, a diameter of said nanoparticles is between 1 and 100 nm, preferably between 1 and 50 nm and more preferably between 1 and 10 nm.

According to a further embodiment of the working fluid, a concentration of said nanoparticles in the fluid is in the range of 0.01 to 1 percent by volume, preferably in the range of 0.05 to 0.5 percent by volume and more preferably in the range of 0.06 to 0.14 percent by volume.

According to a further embodiment of the working fluid, said nanoparticles have a functionalized surface, in particular a hydrophilic surface.

According to a further embodiment of the working fluid, said nanoparticles comprise an oxide monolayer and/or an organic monolayer layer.

Further, a device for converting heat into mechanical energy is disclosed. The device comprises a working fluid according to the described working fluid and an inflow condenser device adapted for at least partly condensing the working fluid thereby removing heat from the working fluid. Said nanoparticles contained in the working fluid increase an overall condensation surface for enhancing and accelerating a condensation process. The condensation process is implemented such that a fraction of a liquid-gas mixture of the working fluid condenses at said nanoparticles.

According to an embodiment the device further comprises a boiler adapted to heat the working fluid for generating the liquid-gas mixture of the working fluid and an expansion device adapted to expand the liquid-gas mixture of the working fluid.

According to a further embodiment of the device, the inflow condenser device comprises a stator heat exchanger for removing heat from the working fluid.

According to a further embodiment of the device, the inflow condenser device comprises a plurality of stator heat exchangers for removing heat from the working fluid, which are arranged in series with respect to a flow direction of the working fluid.

According to a further embodiment the device further comprises a movable element arranged such that the liquid-gas mixture of the working fluid at least partially converts an internal and/or kinetic energy of the liquid-gas mixture of the working fluid into mechanical energy associated with the movable element.

According to a further embodiment of the device, the inflow condenser device comprises a plurality of stator heat exchangers for removing heat from the working fluid, which are arranged in series with respect to a flow direction of the working fluid, and the movable element is arranged between two stator heat exchangers of the inflow condenser device with respect to the flow direction of the working fluid.

According to a further embodiment of the device, the liquid-gas mixture of the working fluid enters the inflow condenser device with a vapor quality between 100% and 80%, preferably between 99% and 93% and/or wherein the liquid-gas mixture of the working fluid leaves the inflow condenser device with a vapor quality between 60% and 40%, preferably between 55% and 45%.

According to a further embodiment of the device, the boiler is a channel flow boiler having at least one channel adapted to heat the working fluid for generating the liquid-gas mixture of the working fluid and wherein said nanoparticles act as nucleation sites for boiling within the at least one channel.

Further, a method for converting heat into mechanical energy is disclosed. The method comprises the following steps:

heating S1 a working fluid comprising nanoparticles for generating a liquid-gas mixture of the working fluid;

expanding S2 the liquid-gas mixture of the working fluid;

converting S3 the internal and/or kinetic energy of the liquid-gas mixture of the working fluid into mechanical energy; and at least partly condensing S4 the liquid-gas mixture of the working fluid in an inflow condenser device such that condensation at least partly sets in at said nanoparticles as condensation nuclei.

The method is operated as a thermodynamic cycle and/or the condensation in the inflow condenser device is approximately isothermal.

According to an embodiment of the method, a plurality of stator heat exchangers enable a cyclic re-cooling during the condensation in the inflow condenser device to allow an isothermal condensation.

Certain embodiments of the presented working fluid for a device for converting heat into mechanical energy, device for converting heat into mechanical energy and method for converting heat into mechanical energy may comprise individual or combined features, method steps or aspects as mentioned above or below with respect to embodiments.

In the following, embodiments of the working fluid, the device and the method are described with reference to the enclosed drawings.

Like or functionally like elements in the drawings have been allotted the same reference characters, if not otherwise indicated.

A working fluid for a device for converting heat into mechanical energy is disclosed. The working fluid comprises a fluid having a boiling temperature in the range between 30 and 250° C. at a pressure of 1 bar and nanoparticles which are dispersed or suspended in the liquid phase of the fluid. Said nanoparticles are instrumented as condensation and/or boiling nuclei and the surface of said nanoparticles is adapted to support condensation and/or boiling.

Because of the working fluid comprising nanoparticles a much smaller and more efficient overall device for converting heat into mechanical energy can be realized. In particular the overall condensation device can be smaller. A nanoparticle assisted condensation allows the use of an inflow condenser device. The working fluid at least partly condenses while running through the inflow condenser device. This is possible because the nanoparticles in the working fluid increase the overall condensation surface while the working fluid is running through the inflow condenser device. That means the nanoparticles act as nucleation sites for the condensation process.

The working fluid comprises a fluid which is adapted to be used in a thermodynamic cycle. During the thermodynamic cycle, the working fluid may be pressurized, expanded, condensed and/or compressed. Further, the working fluid may undergo a phase change, particularly between a liquid phase and a gaseous phase and vice versa. For example, the working fluid may be water. However, the working fluid may also be an organic fluid such as methanol, toluene, or pentane. At a pressure of 1 bar the boiling temperature of the fluid is in the range of 30 to 250° C., preferably in the range of 65 to 200° C. and more preferably in the range of 75 to 150° C. Furthermore, the nanoparticles are distributed in the fluid. In the liquid phase of the fluid the nanoparticles are dispersed or suspended in the fluid.

According to an embodiment of the working fluid, a diameter of said nanoparticles is between 1 and 100 nm, preferably between 1 and 50 nm and more preferably between 1 and 10 nm. If the nanoparticles are small enough they do not damage the rotor elements of the device. If the nanoparticles are smaller than 100 nm they flow with the gas stream and do not impact on the blades thus much less damage will occur.

According to a further embodiment of the working fluid, a concentration of said nanoparticles in the fluid is in the range of 0.01 to 1 percent by volume, preferably in the range of 0.05 to 0.5 percent by volume and more preferably in the range of 0.06 to 0.14 percent by volume. The concentration of the nanoparticles between 0.01 to 1 percent by volume is suitable to allow a fast and effective condensation of the working fluid in the inflow condenser device.

According to a further embodiment of the working fluid, said nanoparticles have a functionalized surface, in particular a hydrophilic surface. A functionalized surface of the nanoparticles can be advantageous for keeping the nanoparticles separated. A hydrophilic surface can prevent an agglomeration of nanoparticles in the fluid.

According to a further embodiment of the working fluid, said nanoparticles comprise an oxide monolayer and/or an organic monolayer. Also the oxide monolayer and/or the organic monolayer of the nanoparticles can prevent an agglomeration of nanoparticles in the fluid. Furthermore, the effectivity of the condensation and/or the boiling can be increased.

Further, a device for converting heat into mechanical energy is disclosed. The device comprises a working fluid according to the described working fluid and an inflow condenser device adapted for at least partly condensing the working fluid thereby removing heat from the working fluid. Said nanoparticles contained in the working fluid increase an overall condensation surface for enhancing and accelerating a condensation process. The condensation process is implemented such that a fraction of a liquid-gas mixture of the working fluid condenses at said nanoparticles.

The device for converting heat into mechanical energy can be reduced in size compared to a conventional engine for converting heat into mechanical energy because the condenser and/or boiler part can be made smaller. The nanoparticle assisted condensation allows the use of an inflow condenser device. The working fluid at least partly condenses while running through the inflow condenser device. This is possible because the nanoparticles in the working fluid increase the overall condensation surface while the working fluid is running through the inflow condenser device. That means the nanoparticles act as nucleation sites for the condensation process. In detail, due to the low temperature/low pressure operation the expansion device is larger. Due to the nanoparticles and the in-flow configuration the boiler and condenser are massively smaller so that they can be included in the now larger expansion device.

According to an embodiment the device further comprises a boiler adapted to heat the working fluid for generating the liquid-gas mixture of the working fluid and an expansion device adapted to expand the liquid-gas mixture of the working fluid. The boiler, the expansion device and the inflow condenser device are comparable in size and can, therefore, be integrated in a combined turbine device.

The boiler may be adapted to provide a liquid-gas mixture. A liquid-gas mixture may comprise a liquid phase of the working fluid and a gaseous phase of the working fluid. Further the boiler may provide a liquid-gas mixture having a mass fraction of the gas or vapor of the liquid-gas mixture which is predetermined. The mass fraction of the gas of a liquid-gas mixture is also called vapor quality. Further, the boiling device may be adapted to provide a liquid-gas mixture in which the liquid phase is finely dispersed into a plurality of small droplets, these droplets being fully entrained in the flowing gas phase by virtue of their small size, so as to avoid undesirable erosion of the movable element, e.g. turbine blades, due to liquid droplet impingement.

The expansion device may comprise an arrangement allowing for an expansion of the liquid-gas mixture. Due to the expansion of the liquid-gas mixture, a volume of the liquid-gas mixture will increase. In order to account for a volume increase of the expanding liquid-gas mixture, an inner volume of the expansion device must also increase, for example, along a flow direction.

The boiler can be at least partially coupled to the expansion device. The expansion device can be adapted to generate mechanical energy. For example, an outlet of the boiler and an inlet of the expansion device may coincide. Furthermore, the expansion device can be at least partially coupled to the inflow condenser device. For example, an outlet of the expansion device and an inlet of the inflow condenser device may coincide. In particular, the boiler, the expansion device and the inflow condenser device may be integrally formed. Further, the boiler and the expansion device may be arranged or aligned such that the kinetic energy of the liquid-gas mixture generated in the boiling device may be maintained during a passage of the liquid-gas mixture from the boiling and acceleration device to the expansion device. In particular, a conduit or a tube between the boiling device and the expansion device may be omitted.

The boiler, the expansion device and the inflow condenser device may each have a preferred direction, such as a flow direction of the working fluid. In embodiments, the preferred direction of the boiler, the expansion device and the inflow condenser device are parallel to one another and/or they are collinear. In an alternative there can be a turn but that reduces efficiency.

According to a further embodiment of the device, the inflow condenser device comprises a stator heat exchanger for removing heat from the working fluid. In the inflow condenser device the condensation process is separated from the heat transfer process. Therefore, the condensation process in the inflow condenser device is a heterogeneous condensation process. The process is mediated by the nanoparticles but does not have an associated heat transfer. In principal this is the same process as cloud formation and fog generation in fog chambers. Therefore, the inflow condenser device comprises at least one stator heat exchanger to perform the heat transfer if no gas expansion is allowed. For miniaturized systems the surface to volume ratio is large so that no explicit heat exchangers are needed on top of the stator to reach the near isothermal operation. The stator heat exchanger is not a necessity. The heat exchange can also be done by volumetric expansion.

According to a further embodiment of the device, the inflow condenser device comprises a plurality of stator heat exchangers for removing heat from the working fluid, which are arranged in series with respect to a flow direction of the working fluid. A plurality of stator heat exchangers can provide a better heat transfer than only one stator heat exchanger.

According to a further embodiment the device further comprises a movable element arranged such that the liquid-gas mixture of the working fluid at least partially converts an internal and/or kinetic energy of the liquid-gas mixture of the working fluid into mechanical energy associated with the movable element.

The movable element may be a rotor element. In particular, the expanding liquid-gas mixture may move the movable element which may at least partially convert the internal and/or kinetic energy of the liquid-gas mixture into mechanical energy associated with the movable element. For example, the movable element may drive or propel a shaft for a generator such as an electrical generator.

In particular, the expanding liquid-gas mixture may propel the movable rotor element of a turbine device. The internal and/or kinetic energy of the expanding liquid-gas mixture may cause the movable rotor element to rotate. Due to a rotation of the rotor element, the internal and/or kinetic energy of the liquid-gas mixture may be converted into a mechanical energy.

According to a further embodiment of the device, the inflow condenser device comprises a plurality of stator heat exchangers for removing heat from the working fluid, which are arranged in series with respect to a flow direction of the working fluid, and the movable element is arranged between two stator heat exchangers of the inflow condenser device with respect to the flow direction of the working fluid. Also in the inflow condenser device the internal and/or kinetic energy of the expanding liquid-gas mixture can be converted into a mechanical energy.

According to a further embodiment of the device, the liquid-gas mixture of the working fluid enters the inflow condenser device with a vapor quality between 100% and 80%, preferably between 99% and 93% and/or wherein the liquid-gas mixture of the working fluid leaves the inflow condenser device with a vapor quality between 60% and 40%, preferably between 55% and 45%. In principle about 90% of the condensation can take place within the inflow condenser device.

According to a further embodiment of the device, the boiler is a channel flow boiler having at least one channel adapted to heat the working fluid for generating the liquid-gas mixture of the working fluid and wherein said nanoparticles act as nucleation sites for boiling within the at least one channel. Because of the nanoparticles the boiling superheat can be low. This is the case because the nanoparticles decrease the surface tension. Boiling and condensation processes are subject to a superheat or supercooling because of the limited heat transfer within the fluid and to the heat exchanger and because boiling needs a geometrical aid (because small bubbles are unstable).

Further, a method for converting heat into mechanical energy is disclosed. The method comprises the following steps:

heating S1 a working fluid comprising nanoparticles for generating a liquid-gas mixture of the working fluid;

expanding S2 the liquid-gas mixture of the working fluid;

converting S3 the internal and/or kinetic energy of the liquid-gas mixture of the working fluid into mechanical energy; and at least partly condensing S4 the liquid-gas mixture of the working fluid in an inflow condenser device such that condensation at least partly sets in at said nanoparticles as condensation nuclei.

The method is operated as a thermodynamic cycle and/or the condensation in the inflow condenser device is approximately isothermal.

The expansion of the liquid-gas mixture of the working fluid is a near-isothermal expansion. That means while expanding the liquid-gas mixture of the working fluid heat is added via the stator heat exchangers. The condensation of the liquid-gas mixture of the working fluid in the inflow condenser device is a near-isothermal condensation. That means while condensing the liquid-gas mixture of the working fluid in the inflow condenser device heat is removed via the stator heat exchangers.

According to an embodiment of the method, a plurality of stator heat exchangers enable a cyclic re-cooling during the condensation in the inflow condenser device to allow an isothermal condensation. The stator heat exchangers in the inflow condenser device are used to remove heat from the working fluid. In an alternative a volumetric fluid expansion is also possible.

Further, the use of a working fluid for a device for converting heat into mechanical energy is disclosed. The working fluid comprises a fluid having a boiling temperature in the range between 30 and 250° C. at a pressure of 1 bar and nanoparticles which are dispersed or suspended in the liquid phase of the fluid. Said nanoparticles are instrumented as condensation and/or boiling nuclei and the surface of said nanoparticles is adapted to support condensation and/or boiling.

It is understood that, in the following, only sections or parts of a device for converting heat into mechanical energy are shown. In actual embodiments additional elements such as valves, tubes, conduits, accessories, fittings, pumps, compressors, and the like can be included.

Figure 1:
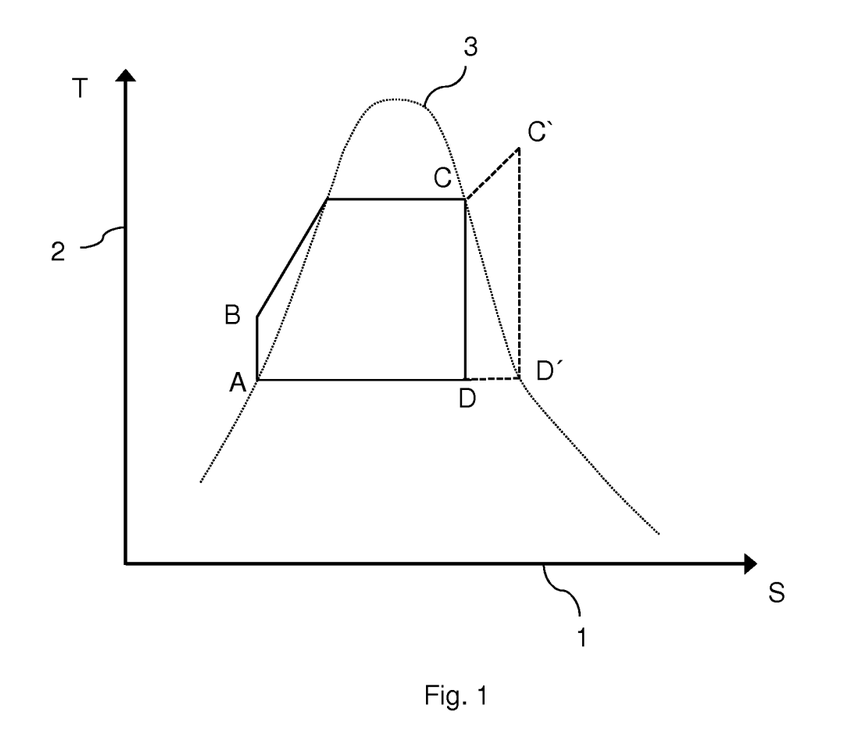
FIG. 1 shows a steam Rankine cycle in a T-s diagram.

The embodiments show some similarity with a Rankine cycle-based process. FIG. 1 shows a steam Rankine cycle in a T-s diagram. In particular, the steam Rankine cycle is commonly used in steam generators generating electrical energy. The abscissa 1 represents an entropy S of the system and the ordinate 2 represents the absolute temperature T of the system. A curve 3 represents the saturation vapor curve of an employed working fluid, for example steam. The Rankine cycle comprises an adiabatic compression of the working fluid (A→B), an isobaric heat addition to the working fluid (B→C), an adiabatic expansion of the working fluid (C→D), and an isobaric heat release (D→A). The efficiency of the Rankine cycle is limited to ~70% of the efficiency of the Carnot cycle. The main differences between the Rankine cycle and the theoretical Carnot cycle are that the heat addition (e.g. in the boiler) and the heat release (e.g. in the condenser) are isobaric (i.e. constant pressure) instead of isentropic (i.e. constant entropy) and that the expansion of the working fluid is adiabatic instead of isothermal. Also, a practical problem encountered for conventional implementation of the Rankine cycle is the formation of water droplets during the adiabatic expansion of the working fluid (C→D). These water droplets result in impingement erosion of the turbine blades. For this reason, the vapor is for example superheated which results in a loss of cycle efficiency. The Rankine cycle with superheat is indicated in FIG. 1 by the process A-B-C-C'-D'-A.

Figure 2:
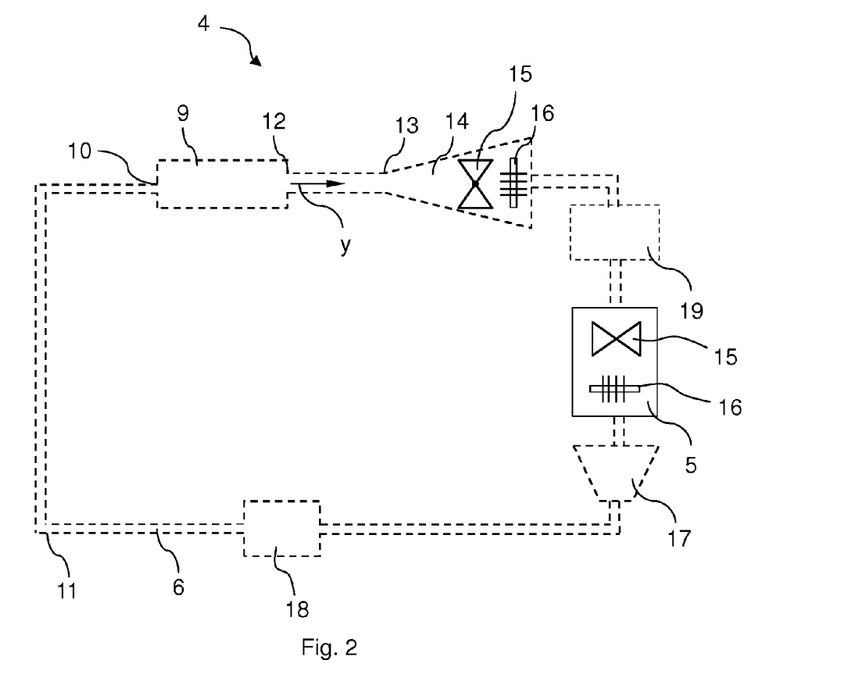
FIG. 2 shows a schematic diagram of a device for converting heat into mechanical energy according to an embodiment.

FIG. 2 shows a schematic diagram of an embodiment of a device 4 for converting heat into mechanical energy. The device 4 comprises an inflow condenser device 5 adapted to at least partly condense a working fluid 6 thereby removing heat from the working fluid 6.

Figure 3:
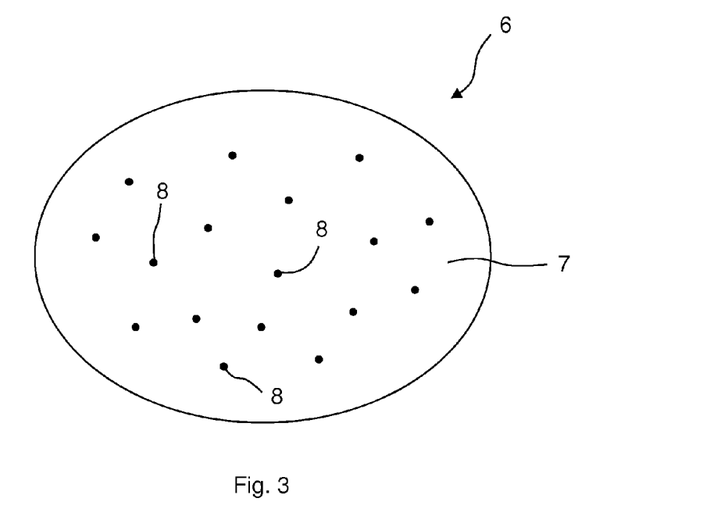
FIG. 3 shows a schematic diagram of a working fluid according to an embodiment.

FIG. 3 shows a schematic diagram of the working fluid 6 according to an embodiment. The working fluid 6 comprises a fluid 7 and nanoparticles 8. The nanoparticles 8 are distributed in the working fluid 6. In the liquid phase of the fluid 7 the nanoparticles are dispersed or suspended. The nanoparticles 8 are instrumented as condensation nuclei. Further, the surface of the nanoparticles 8 is adapted to support condensation.

The device 4 for converting heat into mechanical energy of FIG. 2 comprises the working fluid 6 of FIG. 3. The nanoparticles 8 increase an overall condensation surface which consists of the surface of the nanoparticles 8 and the surface of the inflow condenser device 5. Therefore, the condensation process is enhanced. The condensation process in the inflow condenser device 5 is implemented such that a fraction of a liquid-gas mixture of the working fluid 6 condenses at the nanoparticles 8.

The inflow condenser device 5 can comprise a movable element, in particular a rotor element 15. The rotor element 15 converts internal and/or kinetic energy of the working fluid 6 into mechanical energy. Further, the inflow condenser device 5 can comprise a stator heat exchanger 16 for removing heat from the working fluid 6. In the inflow condenser device 5 the condensation process is separated from the heat transfer process because of the nanoparticles 8. Therefore, the inflow condenser device 5 comprises at least one stator heat exchanger 16 to perform the heat transfer.

The device 4 may further comprise a boiler 9 that is implemented as a channel flow boiler adapted to heat a working fluid 6 for generating and accelerating a liquid-gas mixture from a liquid working fluid 6. The boiler 9 has at least one channel defining a channel direction y. The working fluid 6 is supplied to the boiler 9 via an inlet 10 from a supply line 11. The device 4 may further comprise an expansion device 14. An outlet 12 of the boiler 9 can be connected to an inlet 13 of the expansion device 14. The channel direction y can coincide with a preferred direction of a movable element 15 in the expansion device 14. The expansion device 14 is adapted to expand the liquid-gas mixture and adapted to supply heat to the liquid-gas mixture.

In particular, the expansion device 14 at least partially converts internal and/or kinetic energy into mechanical energy by a movable element, in particular a rotor element 15. Further, the expansion device 14 can comprise a stator heat exchanger 16 for adding heat to the working fluid 6. This allows an isothermal expansion of the working fluid 6.

For performing a thermodynamic cycle, the device 4 may optionally be connected to a conventional condenser 17 and a pump 18. Further, the device 4 can comprise an adiabatic stage 19. The adiabatic stage 19 is arranged between the expansion device 14 and the inflow condenser device 5.

The boiler 9, the expansion device 14 and the inflow condenser device 5 have a comparable size. Hence, a separation of these functions heating, expanding and condensing in individual entities is not necessary. The boiler 9, the expansion device 14 and the inflow condenser device 5 can be one integrated device. In conventional steam engines boilers and condensers (heat exchange devices) have much larger volumes than expansion devices for the current temperatures and pressures established. The disclosed devices and methods allow for smaller and better integrated systems and arrangements for converting heat into mechanical energy.

Figure 4:
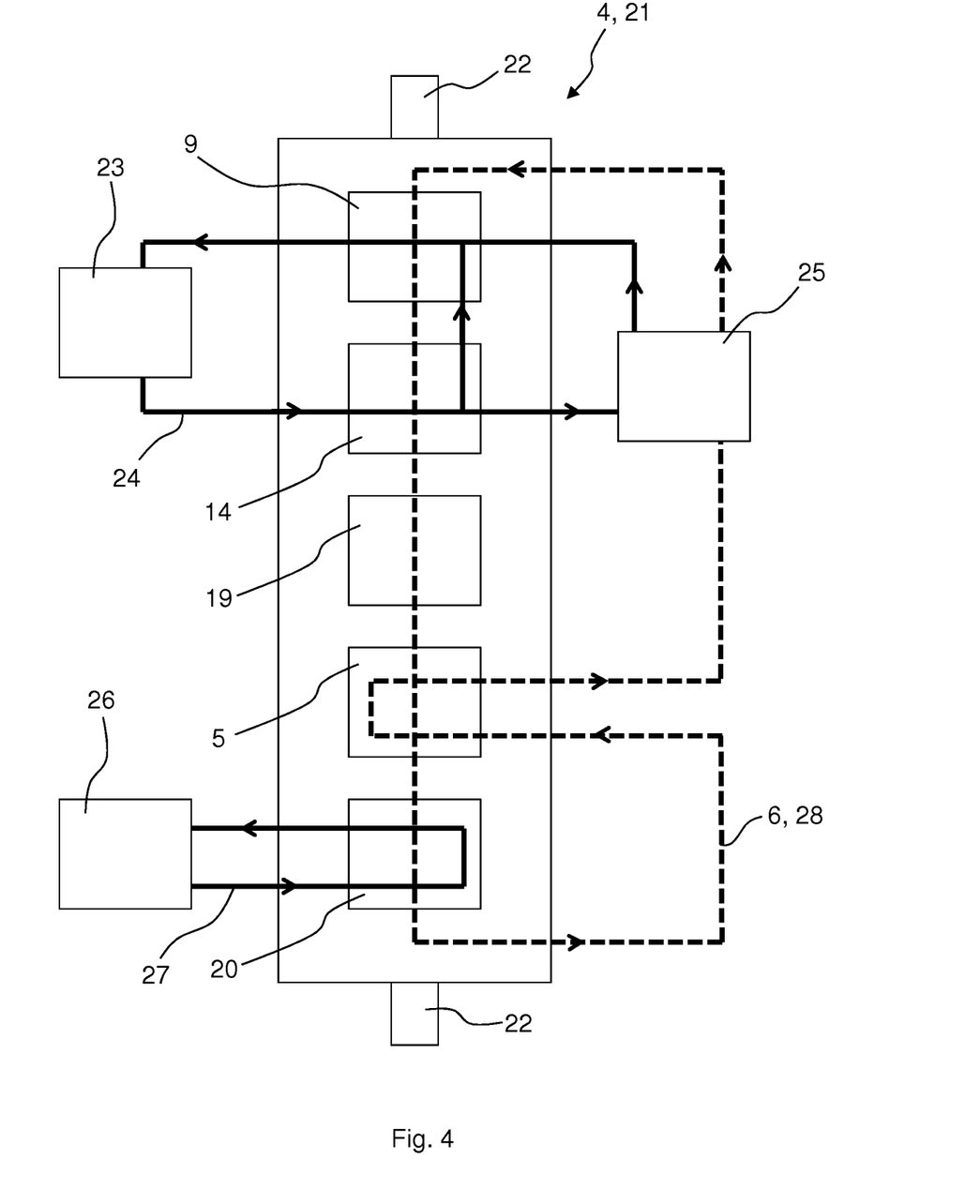
FIG. 4 shows a schematic diagram of a device for converting heat into mechanical energy according to a further embodiment.

FIG. 4 shows a schematic diagram of a device 4 for converting heat into mechanical energy according to a further embodiment. The device 4 comprises a boiler 9, an expansion device 14, an adiabatic stage 19, an inflow condenser device 5 and a condenser device 20. The boiler 9, the expansion device 14, the adiabatic stage 19, the inflow condenser device 5 and the condenser device 20 can be integrated in one single device 4. The device 4 for converting heat into mechanical energy of FIG. 4 is implemented as a turbine 21. The turbine 21 comprises a shaft 22 for transferring the mechanical energy to another device (not shown in FIG. 4).

In FIG. 4 a heat source 23 is connected to the device 4 in a closed loop 24. For example water can be used in the closed loop 24. The closed loop 24 runs through the expansion device 14 and the boiler 9 for providing heat to the expansion device 14 and the boiler 9. Furthermore, the closed loop 24 runs through a heat exchanging device 25.

Further, a cold source 26 is connected to the device 4 in a closed loop 27. For example water can be used in the closed loop 27. The closed loop 27 runs through the condenser device 20 for cooling the condenser device 20.

The working fluid 6 runs through the boiler 9, the expansion device 14, the adiabatic stage 19, the inflow condenser device 5 and the condenser device 20 in a closed loop 28. Furthermore, after leaving the condenser device 20 the closed loop 28 runs through the inflow condenser device 5 for a second time thereby cooling the inflow condenser device 5 and heating the working fluid 6. That means a part of the heat that is lost during the condensation process in the inflow condenser device 5 can be saved when the closed loop 28 runs the second time through the inflow condenser device 5. This increases the overall efficiency of the thermodynamic cycle. Further, the closed loop 28 runs through the heat exchanging device 25 to be heated by the heat source 23 via the closed loop 24 which also runs through the heat exchanging device 25. Then the closed loop 28 reaches the boiler 9 again.

Figure 5:
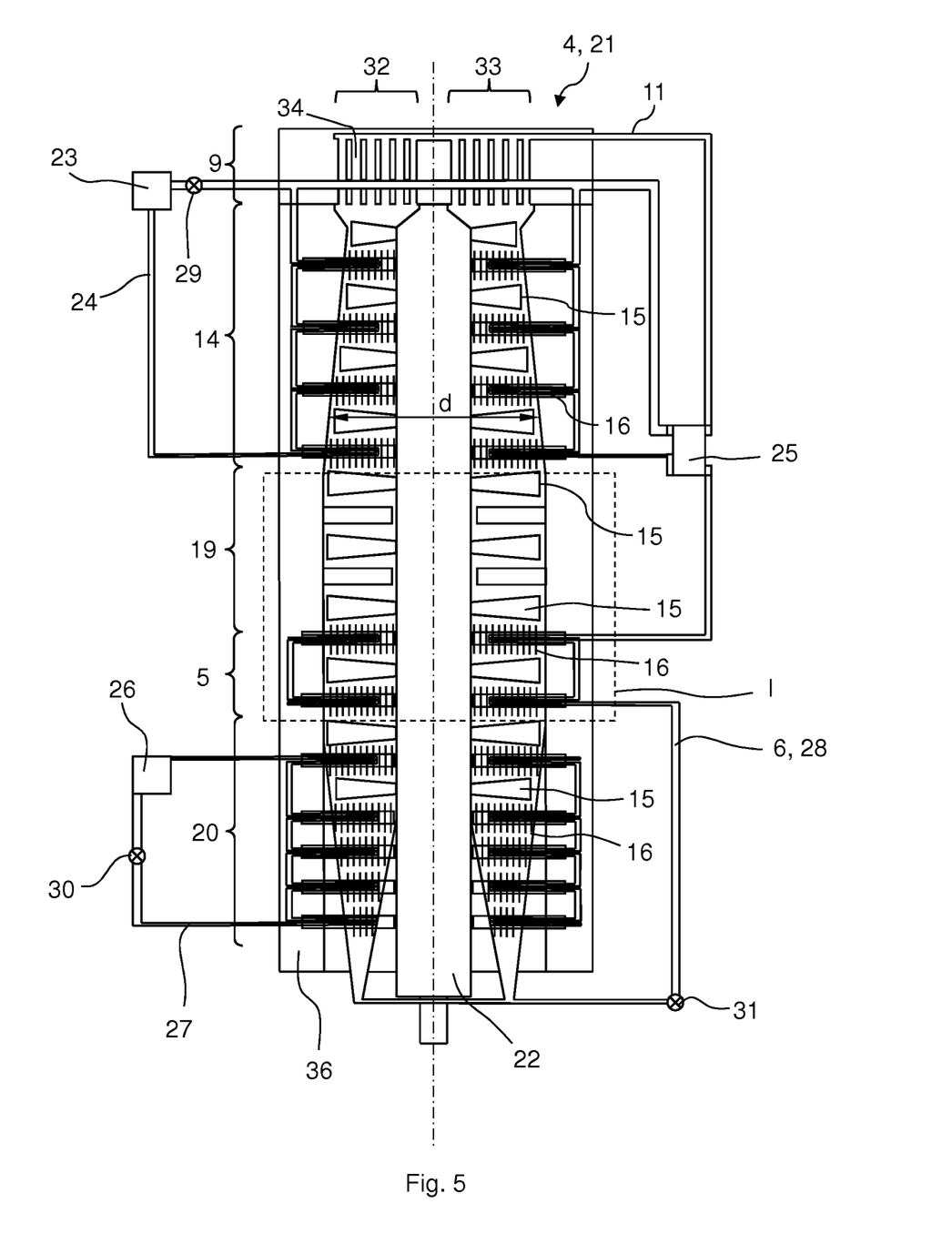
FIG. 5 shows a schematic cross section view of the device for converting heat into mechanical energy according to FIG. 4.

FIG. 5 shows a schematic cross section view of the device 4 for converting heat into mechanical energy according to FIG. 4. As can be seen in FIG. 5 the device 4 comprises 5 sections which are integrated in one single housing 36. The first section comprises the boiler 9, the second section comprises the expansion device 14, the third section comprises the adiabatic stage 19, the fourth section comprises the inflow condenser device 5 and the fifth section comprises the condenser device 20. The device 4 is implemented as a turbine 21. The turbine 21 comprises a shaft 22. A plurality of rotor elements 15 are connected to the shaft 22.

The closed loop 24 connecting the heat source 23 and the expansion device 14 and the boiler 9 comprises a pump 29 for pumping a heated fluid through the expansion device 14 and the boiler 9. Furthermore, the heated fluid of closed loop 24 runs also through the heat exchanging device 25. The heat source 23 may for example be solar thermal energy or industrial waste heat. Further, the closed loop 27 connecting the cold source 26 and the condenser device 20 comprises a pump 30 for pumping a cold fluid through the condenser 20. The closed loop 28 containing the working fluid comprises a pump 31 for pumping the working fluid.

In an alternative configuration the heat exchanging device 25 can be eliminated by connecting the inlets and outlets crosswise. The returning fluid is then heated in the heat source 23 and inserted into supply line 11 via its outlet. There is then only a single loop between heat source 23 and expansion device 14. The benefit of this configuration is that no thermal gradient is introduced between heating fluid and working fluid 6 of the expansion device 14.

Furthermore, the expansion device 14, the inflow condenser device 5 and the condenser device 20 may comprise stator heat exchangers 16 adapted to supply heat to the liquid-gas mixture in expansion and cold to the liquid-gas mixture during the condensation process. In order to supply the heat or cold to the liquid-gas mixture the stator heat exchangers 16 comprise a heat exchanger arrangement. The heat exchanger arrangement comprises a conduit through which a heat or cold carrying fluid is guided. In particular, the heat supplied to the liquid-gas mixture by the stator heat exchangers 16 at least partially compensates a temperature decrease of the liquid-gas mixture in the expansion device 14.

The boiler 9 comprises a first boiler section 32 and a second boiler section 33, wherein each boiler section 32, 33 comprises a plurality of channel flow boilers 34. The number of boiler sections 32, 33 and the geometrical arrangement of the boiler sections 32, 33 may depend on the size and geometry of the subsequent expansion device 14.

A supply line 11 supplies the working fluid 6 to each channel flow boiler 34. A liquid-gas mixture of the working fluid 6 is generated in each channel flow boiler 34 and exits the channel flow boiler 34 in the direction towards the expansion device 14.

The device 4 comprises a plurality of subsequent stages. Each stage can comprise a movable rotor element 15 adapted to at least partially convert the internal and/or kinetic energy of the liquid-gas mixture of the working fluid 6 into mechanical energy. Further, each stage of the device 4 can comprise a stator heat exchanger 16 adapted to supply the heat or cold to the liquid-gas mixture of the working fluid 6. The movable rotor elements 15 and the stator heat exchangers 16 are arranged with respect to a flow direction of the working fluid 6.

As can be seen in FIG. 5 the inner diameter d of the expansion device 14 increases in the flow direction of the working fluid 6. Also the liquid-gas mixture of the working fluid 6 expands in the flow direction of the working fluid 6. The expansion in the expansion device 14 is near-isothermal because heat is added by the stator heat exchangers 16.

The diameter of the adiabatic stage 19 is constant as shown in FIG. 5. In an alternative configuration the adiabatic stage 19 will continuously expand. Furthermore, the adiabatic stage 19 can be composed of multiple stages like in a traditional turbine.

Figure 6:
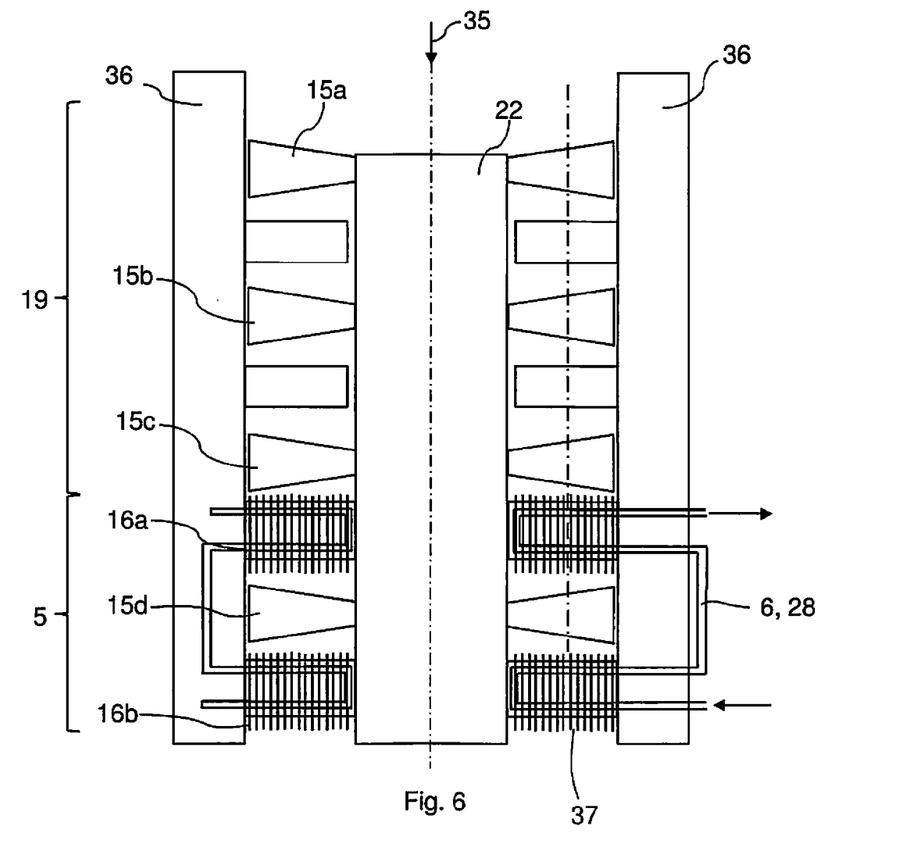
FIG. 6 shows an enlarged view of part I of FIG. 5.

FIG. 6 shows an enlarged view of part I of FIG. 5. That means FIG. 6 shows the adiabatic stage 19 and the inflow condenser device 5 in more detail. Arrow 35 indicates the flow direction of the working fluid 6. As can be seen the adiabatic stage 19 comprises three rotor elements 15a, 15b, 15c and no stator heat exchanger 16. The liquid-gas mixture of the working fluid 6 further expands and no heat is exchanged in the adiabatic stage 19. Therefore, the liquid-gas mixture of the working fluid 6 starts cooling and condensing.

As can be seen in FIG. 6 the adiabatic stage 19 has a constant diameter. However, in an alternative configuration the adiabatic stage 19 continuously expands.

Next the liquid-gas mixture of the working fluid 6 enters the inflow condenser device 5. The inflow condenser device 5, which is shown in FIG. 6, comprises two stator heat exchangers 16a, 16b. Each stator heat exchanger 16a, 16b comprises a plurality of fins 37 adapted to exchange heat with the liquid-gas mixture of the working fluid 6. Further, the device 4 comprises a rotor element 15d in the section of the inflow condenser device 5. The stator heat exchangers 16a, 16b are connected to the closed loop 28 of the working fluid 6. However, a cold liquid-working fluid 6 is running through the stator heat exchangers 16a, 16b thereby cooling the stator heat exchangers 16a, 16b. The liquid-gas mixture of the working fluid 6 flowing in the direction indicated by arrow 35 is cooled at the locations of the stator heat exchangers 16a, 16b. Since the working fluid 6 is also heated due to the condensation process a cyclic re-cooling process takes place in the inflow condenser device 5.

The condensation occurs mainly at the nanoparticles 8 and also at the surfaces within the inflow condenser device 5. The nanoparticles 8 act as nucleation sites for the condensation process. The working fluid 6 at least partly condenses while running through the inflow condenser device 5. This is possible because the nanoparticles 8 in the working fluid 6 increase the overall condensation surface while the working fluid is running through the inflow condenser device 5.

Figure 7:
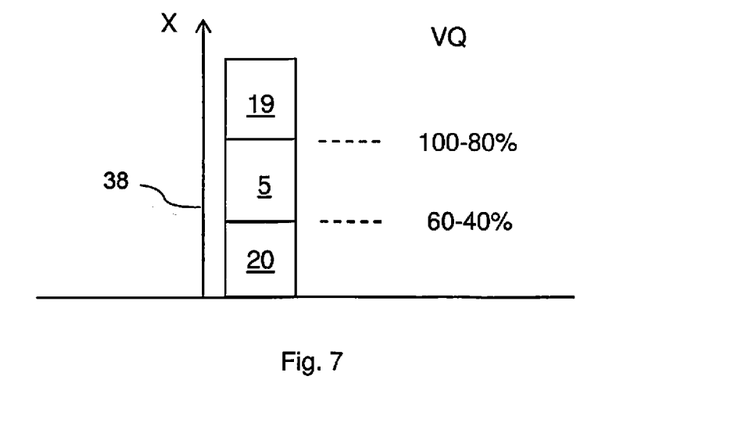
FIG. 7 shows a schematic diagram of the vapor quality in the device shown in FIG. 5.

FIG. 7 shows a schematic diagram of the vapor quality in the device 4 for converting heat into mechanical energy. The mass fraction of the gas of a liquid-gas mixture is called vapor quality. The ordinate 38 shows the location in the device 4. When the liquid-gas mixture of the working fluid 6 leaves the adiabatic stage 19 and enters the inflow condenser device 5 the vapor quality is between 100 to 80%. Further, when the liquid-gas mixture of the working fluid 6 leaves the inflow condenser device 5 and enters the condenser device 20 the vapor quality is between 60 to 40%.

FIG. 5 shows that after the liquid-gas mixture of the working fluid 6 leaves the inflow condenser device 5 it enters the condenser device 20. In the condenser device 20 the remaining condensation takes place so that the working fluid 6 is liquid when it leaves the condenser device 20.

Figure 8:
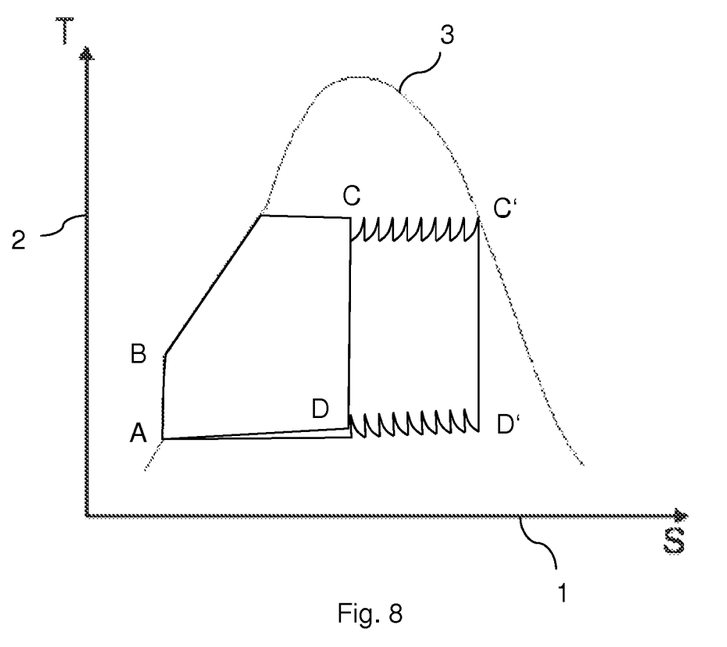
FIG. 8 shows a modified thermodynamic cycle in a T-s diagram according to a similar device as shown in FIG. 5.

FIG. 8 shows a modified thermodynamic cycle in a T-s diagram according to an operation of a similar device 4 as shown in FIG. 5. In this similar device 4 the cross-section of the adiabatic stage 19 increases. The abscissa 1 represents the entropy S of the system, and the ordinate 2 represents the absolute temperature T of the system. A curve 3 represents the saturation vapor curve of an employed working fluid, for example steam. The modified thermodynamic cycle comprises an adiabatic compression of the working fluid (A→B), a heat addition to the working fluid (B→C) in the channel flow boiler 34 followed by an approximately isothermal expansion (C→C') in the expansion device 14. The tooth structure shown between the points C and C' represents a series of expansions of the working fluid 6, wherein each expansion is combined with a reheating of the working fluid 6. Due to the adiabatic expansion of the working fluid 6 and a further evaporation of a fraction of the liquid phase of the liquid-gas mixture in the expansion device 14, the temperature decreases which is apparent from the vertical sections of the curve between C and C'. The decrease in temperature is subsequently compensated by a supply of heat in each stator heat exchanger 16 of the expansion device 14. This is illustrated by the rising sections following the vertical ones.

After the remaining liquid phase in the liquid-gas mixture is evaporated, the working fluid undergoes an adiabatic expansion (C'→D') in an adiabatic stage 19 of the device 4. The thermodynamic cycle shown in FIG. 4 is completed by a heat release (D'→A) in the inflow condenser device 5 and the condenser device 20. Due to the condensation process in the inflow condenser device 5 heat is added to the working fluid 6, i.e. the temperature increases which is apparent from the rising sections of the curve between D' and D. In the inflow condenser device 5 heat is removed by each stator heat exchanger 16 of the inflow condenser device 5. This is illustrated by the vertical lines following the rising sections. In principle, the vertical lines can be accomplished in three ways. The first way is cooling through the stator heat exchangers 16. The second way is expansion and mechanical energy extraction through the rotor elements 15. The third way is volumetric expansion.

The disclosed device 4 and method are preferably implemented such that an expansion or condensation of the liquid gas mixture of the working fluid 6 occurs approximately isothermally. It is understood that, referring to FIG. 8 the process section between C and C' as well as between D' and D occurs in a limited temperature range defined by the teeth of the curves. The height or amplitude of the teeth is within the temperature range considered approximately isothermal.

Figure 9:
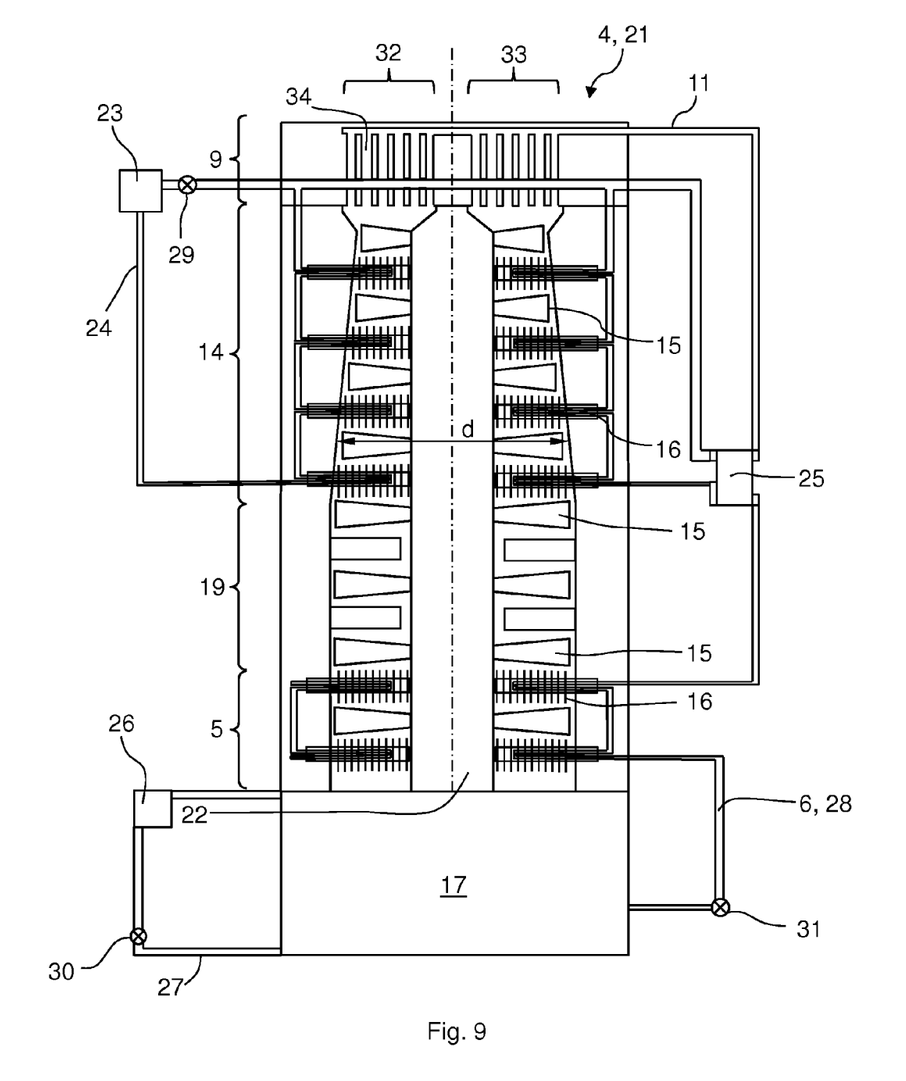
FIG. 9 shows a schematic cross section view of a device for converting heat into mechanical energy according to a further embodiment.

FIG. 9 shows a schematic cross section view of a device 4 for converting heat into mechanical energy according to a further embodiment. The device of FIG. 9 is very similar to the device of FIG. 5. The only difference is that the device 4 of FIG. 9 does not comprise a condenser device 20. Instead device 4 of FIG. 9 is connected to a conventional condenser 17. Of course a remaining condensation of the working fluid 6 after the working fluid 6 has passed the inflow condenser device 5 can be done in a conventional condenser 17 which is connected to the device 4.

Figure 10:
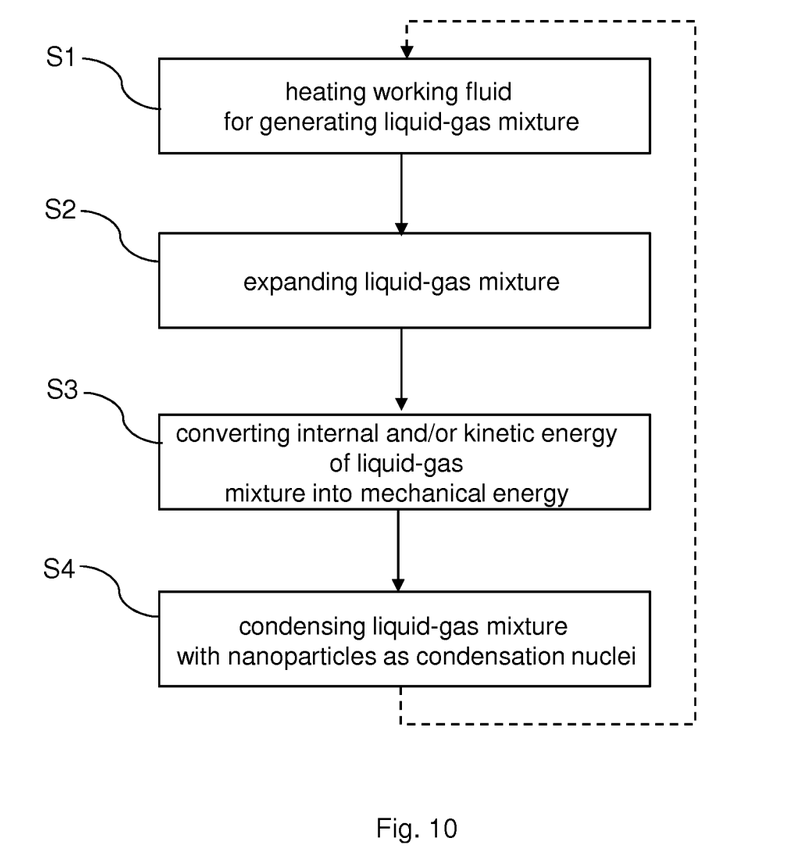
FIG. 10 shows a flow chart of a method for converting heat into mechanical energy according to an embodiment.

FIG. 10 shows a flow chart of a method for converting heat into mechanical energy according to an embodiment. The method steps are not necessarily performed in the sequence depicted in the flow chart of FIG. 10. In a first step S1 a working fluid 6 comprising nanoparticles is heated for generating a liquid-gas mixture of the working fluid 6. This may be performed in a boiler 9, for example a channel flow boiler 34. The nanoparticles can enhance the boiling process.

In a second step S2 the generated liquid-gas mixture of the working fluid 6 is expanded. Due to the expansion of the liquid-gas mixture of the working fluid 6 and a further evaporation of a fraction of the liquid phase in the liquid-gas mixture of the working fluid 6, the temperature of the liquid-gas mixture decreases. This temperature decrease is at least partially compensated by supplying heat to the liquid-gas mixture. Therefore, a near-isothermal expansion is performed.

In a third step S3 the internal and/or kinetic energy of the liquid-gas mixture of the working fluid 6 is converted into mechanical energy associated with a movable element, for example a rotor element 15.

In a fourth step S4 the liquid-gas mixture of the working fluid 6 is condensed in an inflow condenser device 5 such that condensation at least partly sets in at the nanoparticles as condensation nuclei. Further, the method is utilized in a thermodynamic cycle process. The entire method may be repeated, as indicated with the dashed arrow. For example, the method may be employed in a thermodynamic cycle process used for driving an electrical generator. The condensation in the inflow condenser device 5 is approximately isothermal. While condensing the liquid-gas mixture of the working fluid 6 in the inflow condenser device 5 heat is removed via the stator heat exchangers 16.

A plurality of stator heat exchangers 16 enable a cyclic recooling during the condensation in the inflow condenser device. Therefore, an isothermal condensation can be realized.

It is understood that the depicted embodiments can be modified without departing from the general concept depicted in this disclosure. In particular, the number and form of the modules, sections, rotor elements, stator heat exchangers, conduits etc. may vary according to the specific application of the system.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

LIST OF REFERENCE CHARACTERS 1 abscissa
2 ordinate
3 saturation vapor curve
4 device for converting heat into mechanical energy
5 inflow condenser device
6 working fluid
7 fluid
8 nanoparticles
9 boiler
10 inlet of boiler
11 supply line
12 outlet of boiler
13 inlet of expansion device
14 expansion device
15 rotor element
16 stator heat exchanger
17 conventional condenser
18 pump
19 adiabatic stage
20 condenser device
21 turbine
22 shaft
23 heat source
24 closed loop of the heat source
25 heat exchanging device
26 cold source
27 closed loop of the cold source
28 closed loop of the working fluid
29 pump
30 pump
31 pump
32 first boiler section
33 second boiler section
34 channel flow boiler
35 arrow
36 housing
37 fins
38 ordinate
d inner diameter of the expansion device
S1-S4 method steps
VQ vapor quality
y channel flow boiler direction

The invention claimed is:

1. A device for converting heat into mechanical energy comprising:
   a working fluid comprising:
   a fluid having a boiling temperature in the range between 30 and 250° C. at a pressure of 1 bar: and
   nanoparticles which are dispersed or suspended in the liquid phase of the fluid; wherein said nanoparticles are instrumented as condensation and/or boiling nuclei and wherein the surface of said nanoparticles is adapted to support condensation and/or boiling;
   an inflow condenser device adapted for at least partly condensing the working fluid thereby removing heat from the working fluid, the inflow condenser device comprising a plurality of stator heat exchangers which are arranged in series with respect to a flow direction of the working fluid for removing heat from the working fluid; and
   a rotor arranged between two stator heat exchangers of the inflow condenser device with respect to the flow direction of the working fluid so that a liquid-gas mixture of the working fluid at least partially converts an internal and/or kinetic energy of the liquid-gas mixture of the working fluid into mechanical energy associated with the rotor;
   wherein said nanoparticles contained in the working fluid are adapted to increase an overall condensation surface for enhancing and accelerating a condensation process and wherein the condensation process is implemented such that a fraction of the liquid-gas mixture of the working fluid condenses at said nanoparticles.

2. The device of claim 1, further comprising
   a boiler adapted to heat the working fluid for generating the liquid-gas mixture of the working fluid; and
   a turbine adapted to expand the liquid-gas mixture of the working fluid.

3. The device of claim 1, wherein the liquid-gas mixture of the working fluid enters the inflow condenser device with a vapor quality between 100% and 80% or between 99% and 93% and/or wherein the liquid-gas mixture of the working fluid leaves the inflow condenser device with a vapor quality between 60% and 40% or between 55% and 45%.

4. The device of claim 2, wherein the boiler is a channel flow boiler having at least one channel, said channel flow boiler heating the working fluid for generating the liquid-gas mixture of the working fluid and wherein said nanoparticles act as nucleation sites for boiling within the at least one channel.

5. A method for converting heat into mechanical energy, wherein the method comprises:

heating (S1) a working fluid comprising nanoparticles for generating a liquid-gas mixture of the working fluid;

expanding (S2) the liquid-gas mixture of the working fluid;

converting (S3) the internal and/or kinetic energy of the liquid-gas mixture of the working fluid into mechanical energy; and at least partly condensing (S4) the liquid-gas mixture of the working fluid in an inflow condenser device such that condensation at least partly sets in at said nanoparticles as condensation nuclei;

wherein said inflow condenser device comprises a plurality of stator heat exchangers which are arranged in series with respect to a flow direction of the working fluid for removing heat from the working fluid; and wherein a rotor is arranged between two stator heat exchangers of the inflow condenser device with respect to the flow direction of the working fluid so that the liquid-gas mixture of the working fluid at least partially converts an internal and/or kinetic energy of the liquid-gas mixture of the working fluid into mechanical energy associated with the rotor; and wherein the method is operated as a thermodynamic cycle and/or the condensation in the inflow condenser device is approximately isothermal.

6. The method of claim 5, wherein the plurality of stator heat exchangers enable a cyclic re-cooling during the condensation in the inflow condenser device to allow an isothermal condensation.

7. The device of claim 1, wherein a diameter of said nanoparticles in said working fluid is between 1 and 100 nm.

8. The device of claim 1, wherein a concentration of said nanoparticles in the working fluid is in the range of 0.01 to 1 percent by volume.

9. The device of claim 1, wherein said nanoparticles have a functionalized surface.

10. The device of claim 1, wherein said nanoparticles comprise an oxide monolayer and/or an organic monolayer.

11. The device of claim 1, wherein a diameter of said nanoparticles in said working fluid is between 1 and 50 nm.

12. The device of claim 1, wherein a diameter of said nanoparticles in said working fluid is between 1 and 10 nm.

13. The device of claim 1, wherein a concentration of said nanoparticles in the fluid is in the range of 0.05 to 0.5 percent by volume.

14. The device of claim 1, wherein a concentration of said nanoparticles in the fluid is in the range of 0.06 to 0.14 percent by volume.

15. The device of claim 1, wherein said nanoparticles have a hydrophilic surface.

* * * * *